United States Patent
Matsuyama et al.

(10) Patent No.: US 6,927,822 B2
(45) Date of Patent: Aug. 9, 2005

(54) ORIENTATION DIVISION TYPE LIQUID CRYSTAL DISPLAY, FABRICATION METHOD THEREOF AND IMAGE DISPLAY METHOD

(75) Inventors: Hiroaki Matsuyama, Tokyo (JP); Kiyomi Kawada, Tokyo (JP); Seiji Suzuki, Tokyo (JP); Yoshihiko Hirai, Tokyo (JP); Michiaki Sakamoto, Tokyo (JP); Mamoru Okamoto, Tokyo (JP); Yuji Yamamoto, Tokyo (JP); Toshiya Ishii, Tokyo (JP); Teruaki Suzuki, Tokyo (JP); Ken Sumiyoshi, Tokyo (JP); Masayoshi Suzuki, Tokyo (JP)

(73) Assignee: NEC LCD Technologies, Kanagawa (JP)

(*) Notice: Subject to any disclaimer, the term of this patent is extended or adjusted under 35 U.S.C. 154(b) by 0 days.

(21) Appl. No.: 10/858,953

(22) Filed: Jun. 2, 2004

(65) Prior Publication Data

US 2004/0218128 A1 Nov. 4, 2004

Related U.S. Application Data

(62) Division of application No. 09/741,330, filed on Dec. 20, 2000, now Pat. No. 6,768,530.

(30) Foreign Application Priority Data

Dec. 20, 1999 (JP) ............................................. 11-361610

(51) Int. Cl.[7] .............................................. G02F 1/1337
(52) U.S. Cl. ....................................... 349/123; 349/106
(58) Field of Search ................................... 349/123, 106

(56) References Cited

U.S. PATENT DOCUMENTS 5,815,232 A * 9/1998 Miyazaki et al. ........... 349/155

| | | | |
|---|---|---|---|
| 6,115,098 A | 9/2000 | Kume et al. | |
| 6,327,016 B1 | 12/2001 | Yamada et al. | |
| 6,424,397 B1 | 7/2002 | Kuo | |
| 6,437,847 B1 | 8/2002 | Kishimoto | |
| 6,724,452 B1 * | 4/2004 | Takeda et al. | ............... 349/139 |

FOREIGN PATENT DOCUMENTS

| EP | 0884626 A2 | 12/1998 |
|---|---|---|
| JP | 4-320212 | 11/1992 |
| JP | 7-311383 | 11/1995 |
| JP | 8-29790 | 2/1996 |
| JP | 8-152639 | 6/1996 |
| JP | 10-48631 | 2/1998 |
| JP | 11-952220 | 4/1999 |

* cited by examiner

*Primary Examiner*—Robert H. Kim
*Assistant Examiner*—Prasad R. Akkapeddi
(74) *Attorney, Agent, or Firm*—Scully, Scott, Murphy & Presser

(57) ABSTRACT

In an orientation division type liquid crystal display device for widen a viewing angle of a display pixel of an active matrix type liquid crystal color display device having a COT structure, pixel color layers (6B, 6R, 6G) as color filters and pixel electrodes 3 are formed on a substrate on the side of the pixel electrodes and slopes 13 are provided along four side peripheries of each pixel electrode. Liquid crystal molecules 8 between each pixel electrode of the pixel electrode substrate and a common electrode of an opposing substrate are controlled in orientation direction along the slopes to divide it to a plurality of directions to thereby widen a viewing angle of a pixel display. The slope is formed on a step portion 12 formed by a BM layer formed on at least one of a gate electrode, a drain electrode and a source electrode formed in a periphery of the pixel electrode or at least one of a gate wiring and a drain wiring formed in the periphery or a step portion formed by partially overlapping peripheral portions of the adjacent pixel color layers.

1 Claim, 8 Drawing Sheets

ORIENTATION DIVISION TYPE LIQUID CRYSTAL DISPLAY, FABRICATION METHOD THEREOF AND IMAGE DISPLAY METHOD

CROSS-REFERENCE TO RELATED APPLICATIONS

The present application is a divisional of application Ser. No. 09/741,330 filed on Dec. 20, 2000 now U.S. Pat. No. 6,768,530.

BACKGROUND OF THE INVENTION

1. Field of the Invention

The present invention relates to an orientation division type liquid crystal display device and a fabrication method thereof and, particularly, the present invention relates to an orientation division type liquid crystal display device of an active matrix drive type, which has a COT (Color filter on TFT) structure in which color filters are arranged on a pixel electrode side substrate having TFT (Thin Film Transistor) switching elements, which is capable of widening a viewing angle of pixel display. Furthermore, the present invention relates to an image display method for use in the orientation division type liquid crystal display device to widen a viewing angle of the pixel display.

2. Description of the Prior Art

The liquid crystal display device has been utilized in various fields as a display device for a television receiver, personal computer and projector, etc., due to the merits of lightweight and low power consumption characteristics thereof. Particularly, the color liquid crystal display device has become popular and the image display mode thereof has been expanded to a monochromatic display, multi-color display and full color display according to objects and use.

As a drive system of the color liquid crystal display, there is an active matrix drive type color liquid crystal display having a switching element such as silicon TFT provided for each of a number of display pixels for controlling a write operation of signal voltage.

With the recent improvement in fineness and coloring of a liquid crystal display device, the increase of the viewing angle of a pixel color layer region of color filters has been required, in view of the image contrast and clearness of image display. In order to accommodate to such request, there have been various proposals for increasing the viewing angle by controlling orientation of liquid crystal molecules.

For example, Japanese Patent Publication of Non-Examined Application No. H7-311383 discloses a liquid crystal orientation control in which a slope portion of a transparent electrode film of ITO (Indium Tin Oxide) is provided to control the orientation of liquid crystal molecules along the slope surface.

Furthermore, an opening portion or a protruding portion is provided in a transparent electrode on the side of an opposing substrate and, in combination with the orientation control slope of the pixel electrode, the orientation of liquid crystal molecules is controlled.

In Japanese Patent Publication of Non-Examined Application No. H8-152639, a surface of an opposing substrate on which color filters are provided correspondingly to pixel electrodes on a pixel electrode substrate is made corrugated to divide the orientation direction of liquid crystal molecules to a plurality of orientation directions along the protruding portions thereof.

Under the circumstances, it is usual in the conventional color liquid crystal display device including the above mentioned prior arts to provide pixel color layers as color filters of each of pixels on the side of an opposing substrate.

On the other hand, there is an active matrix drive type liquid crystal display device having a COT structure which includes the pixel color layers as color filters arranged on the side of a pixel electrode substrate.

By employing the COT structure in each pixel region (G, R, B) of a pixel electrode array, it is possible to concentrate the complicated fabrication process for a drain electrode, a drain wiring, a gate electrode and a gate wiring, etc., in four peripheral sides of the pixel electrode on the side of one of the substrates to thereby facilitate the fabrication and reduce the process load.

Furthermore, it is usual in one pixel region to provide a black matrix (BM) layer between adjacent pixel color layers and between corresponding pixel electrode arrays. In such COT structure, four peripheral sides of each pixel electrode are separated from those of adjacent pixel electrodes by the BM layer while utilizing the above-mentioned merits in fabrication process. It is easy to form the BM layer thicker than a usual BM layer.

The conventional liquid crystal display devices described hereinbefore do not employ the COT structure. That is, color filters are arranged on the side of the opposing substrate and the slope portions, etc., are formed on the side of the opposing substrate to divide the orientation of liquid crystal molecules to thereby widen the viewing angle of the pixel display.

There is no detail description of formation of slopes in Japanese Patent Publication of Non-Examined Application No. H8-152639. Assuming that such slope is formed, for example, on or through a step portion provided on the side of an opposing substrate, the initial orientation of liquid crystal molecules on the side of the opposing substrate become opposite to the initial orientation of liquid crystal molecules on the side of the pixel electrode substrate, so that it is impossible to evenly divide orientation of liquid crystal molecules to a plurality of directions.

In the proposal disclosed in the above-mentioned Japanese Patent Publication of Non-Examined Application No. H7-311383, a transparent electrode of an opposing substrate is formed on an insulating layer to step up the transparent electrode to thereby form a slope as an orientation control dislocation layer.

However, since the orientation control dislocation layer is usually formed by etching SiNx or $SiO_2$, etc., it is not easy to form a clearly defined step portion.

Furthermore, it is very difficult to control the initial orientation of liquid crystal molecules to a desired angle by such gentle slope formed on suchsmall step portion. Therefore, it is very difficult to shorten the response time by more clearly dividing the initial orientation direction.

SUMMARY OF THE INVENTION

An object of the present invention is to provide, in a liquid crystal display device including a substrate having a COT structure in which pixel color layers as color filters and pixel electrodes are provided on the substrate and various electrodes or electrode wiring are concentrically provided in peripheries of the pixel color layers, an orientation division type liquid crystal display device, which is superior in response time for initial orientation, capable of clearly and evenly dividing the orientation direction to a plurality of directions to thereby widen a viewing angle of pixel display.

Another object of the present invention is to provide a method of fabricating such orientation division type liquid crystal display devices.

A further object of the present invention is to provide an image display method for widening the viewing angle of a pixel display.

As a result of studies made by the inventors of the present invention in order to solve the problems of the prior art, it has been found that it is possible to relatively easily form a step portion in a peripheral portion of a pixel electrode during a forming process of a black matrix (BM) layer provided between adjacent pixel color layers provided correspondingly to the pixel electrode.

That is, according to the present invention, an orientation division type liquid crystal display device is featured in that a substrate opposing to an opposing substrate on which a common electrode is formed has a COT structure in which pixel color layers as color filters and pixel electrodes are provided on the substrate and a slope having a clear angle with respect to a surface of the opposing substrate is provided in a periphery of each of four sides of the pixel electrode.

The slope may be formed on at least one of a gate electrode, a gate wiring, a drain electrode, a drain wiring and a source electrode, which are provided in the peripheral portion of the pixel electrode.

Alternatively, the slope may be formed on a step portion formed by the BM layer from on one of the electrodes and one of the wiring, which has a vertical height clearly defined with respect to a plane of the pixel electrode.

According to the present invention, an orientation division type liquid crystal display device in which a similar slope is formed on a step portion formed by overlapping edge portions of adjacent pixel color layers is provided.

Liquid crystal molecules filling a space between the substrate and the opposing substrate are aligned vertically with respect to surfaces of the slopes provided in the peripheries of the four sides of the pixel electrode, so that orientation of liquid crystal molecules on the pixel electrode is divided to a plurality of directions by the slope.

According to the present invention, a method for fabricating the orientation division type liquid crystal display device is provided, which comprises the steps of arranging a pixel electrode substrate having pixel color layers as color filters and pixel electrodes thereon and slope surfaces in peripheries of four sides of each pixel electrode in an opposing relation to an opposing substrate, filling a space between the pixel electrode substrate and the opposing substrate with liquid crystal molecules so that orientation of liquid crystal molecules can be controlled by the slope surfaces.

That is, in this fabrication method, the pixel color layers corresponding to the pixel electrode are formed on an insulating layer such as an insulating film or a passivation film on the pixel electrode substrate.

Then, the step portions are formed by the BM layer having thickness larger than a thickness of the pixel color layers and partitioning the pixel color layers.

Below the BM layer forming the step portion, a passivation film is formed as an underlying layer and, below the passivation film, at least one of the gate electrode, the gate wiring, the drain electrode, the drain wiring and the source electrode is formed as an underlying layer.

Then, an overcoat layer is formed on the whole surface of the pixel electrode substrate and, after the transparent pixel electrodes are formed, an alignment layer is formed on the whole surface of the pixel electrode substrate. Thus, the slope surfaces, which surround the four sides of each pixel electrode, are formed on the step portion formed by the BM layer.

According to this fabrication method, it is possible to concentrically form the slope surfaces for dividing the orientation of liquid crystal on the side of the pixel electrode substrate during the step of forming the COT structure, while reducing the process load by the use of the COT structure.

According to the present invention, a method for fabricating the orientation dividing type liquid crystal display device is featured in that the BM layer is formed on only a portion of the periphery of the pixel electrode and the step portion is formed by partially overlapping edge portions of adjacent ones of the color filter films during the formation of the pixel color layers corresponding to the pixel electrode and the slope surfaces are formed on the step portion.

Furthermore, according to the present invention, an image display method is provided, which uses the orientation division type liquid crystal display device and comprises the step of performing an initial orientation control through the slope surfaces to widen the viewing field of pixel display to thereby clarify the pixel display.

That is, by forming the clearly defined slope surfaces in the peripheries of the four sides of each pixel electrode, liquid crystal molecules on the pixel electrode between the opposing substrate and the pixel electrode substrate become in company with liquid crystal molecules preliminarily oriented vertically to the slope surfaces with an aid of an electric field, which is bulged in an area surrounding the pixel electrode when the orientation direction is changed by applying a voltage across the liquid crystal layer, so that it is possible to immediately determine the alignment direction.

Therefore, it is possible to substantially reduce the response time of initial orientation of liquid crystal molecules within the cell gap and it is possible to evenly divide orientation of liquid crystal molecules on the pixel electrode to a plurality of directions to thereby widen the viewing angle of the pixel display in the pixel region.

BRIEF DESCRIPTION OF THE DRAWINGS

The above mentioned and other objects, features and advantages of the present invention will become more apparent by reference to the following detailed description of the invention taken in conjunction with the accompanying drawings, in which.

DETAILED DESCRIPTION OF THE PREFERRED EMBODIMENTS

Figure 1:
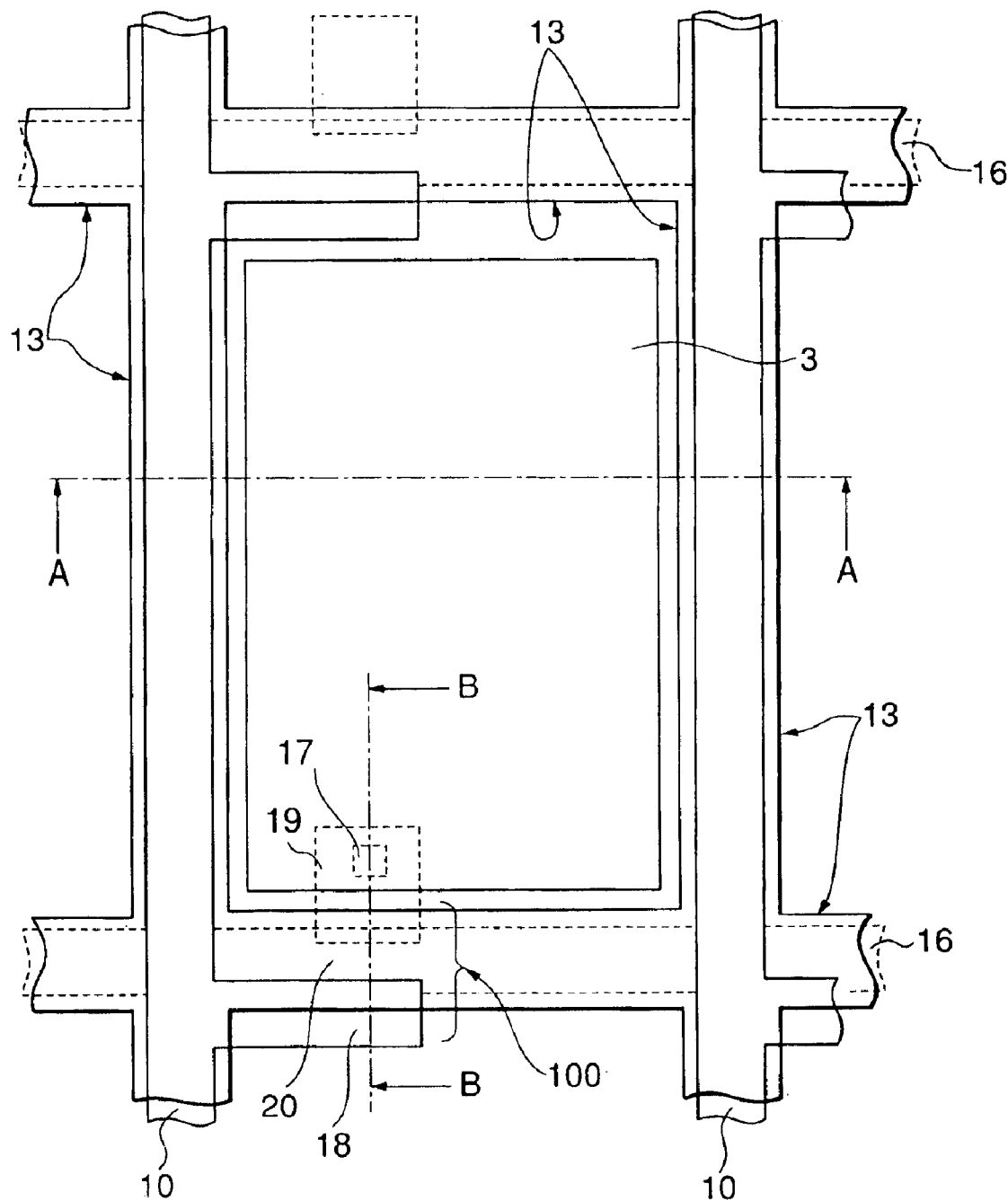
FIG. 1 is an enlarged plan view of one pixel electrode portion of a pixel electrode array, conceptually showing an embodiment of an orientation division type liquid crystal display device according to the present invention.
Figure 2A:
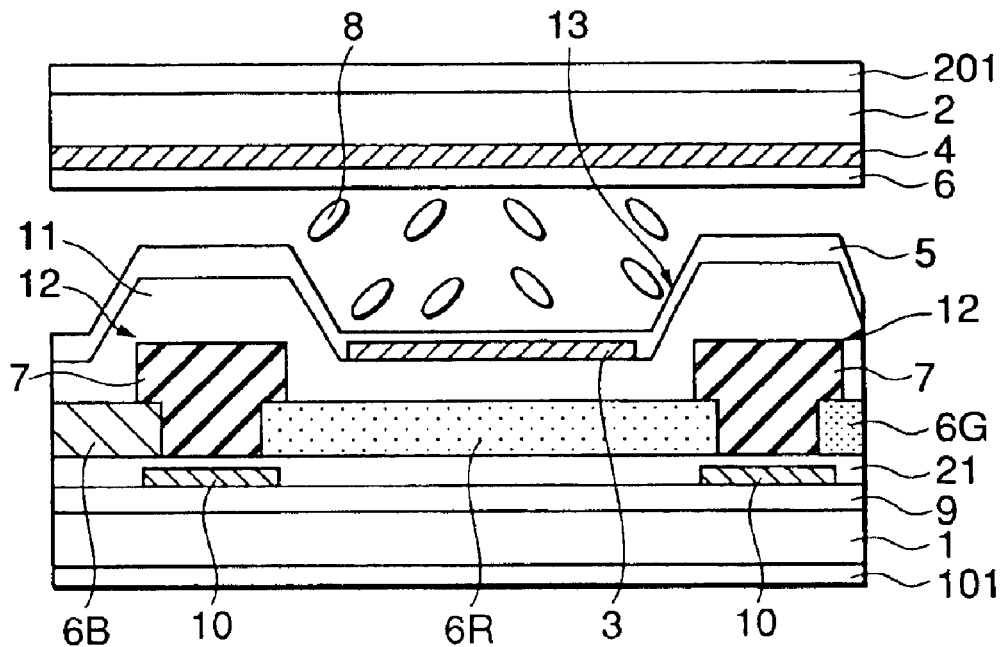
FIG. 2A is a cross section taken along a line A—A in FIG. 1.

FIG. 1 shows one of pixel electrodes 3 of a pixel electrode array, a TFT (Thin Film Transistor) 100 and a wiring pattern of an orientation division type liquid crystal display device according to the present invention and FIG. 2A is a cross section taken along a line A—A in FIG. 1, showing a drain wiring 10 and the pixel electrode 3 along a direction parallel to a gate electrode wiring 16.

In FIG. 2A, the pixel electrode 3 is provided on the side of a transparent glass substrate (pixel electrode substrate) 1 and a pixel color layer (red) 6R is provided correspondingly to the pixel electrode 3. Although not shown completely in FIG. 2A, a pixel color layer (blue) 6B and a pixel color layer (green) 6G corresponding to the same pixel electrode 3 are arranged on both sides of the pixel color layer 6R.

A black matrix (BM) layer 7 separates the pixel color layers 6R, 6B and 6G from each other and a drain wiring 10 is formed under a passivation film 21 below the BM layer 7. Light shield plates 101 and 201 are formed on outer surfaces of the substrate 1 and an opposing substrate 2 having a common electrode 4.

Figure 2B:
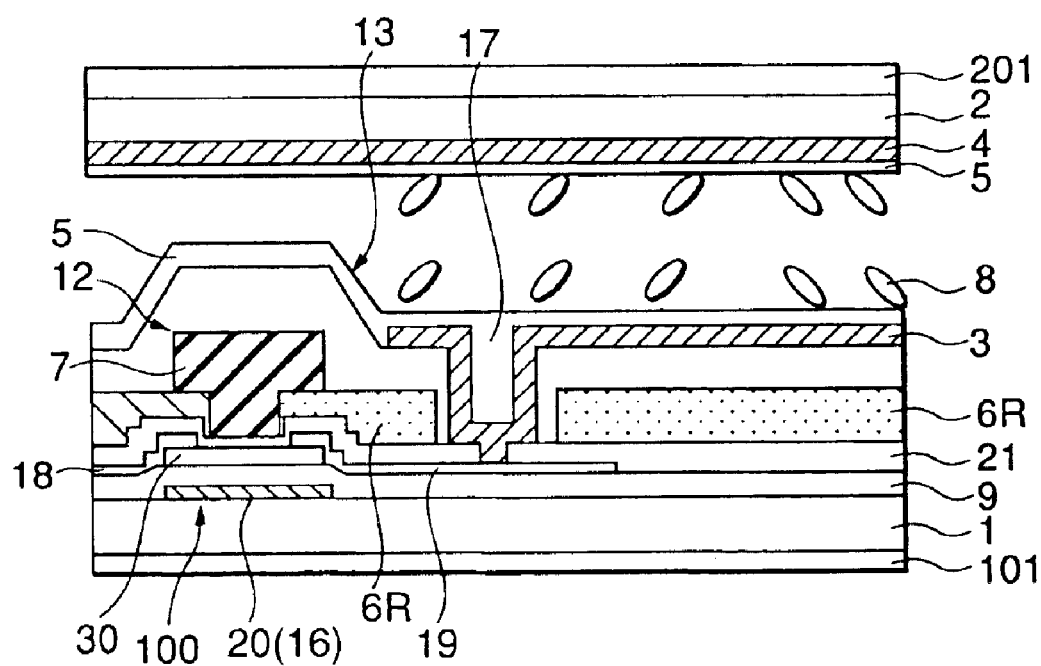
FIG. 2B is a cross section taken along a line B—B in FIG. 1.

As shown in FIG. 2B showing a cross section of the pixel electrode 3 taken along a Line B—B in FIG. 1, a TFT 100 is formed under the passivation film 21 below the BM layer 7. That is, a gate electrode 20, a gate insulating film 9, a semiconductor 30, a drain electrode 18 and A source electrode 19, etc., are concentrically formed below the BM layer 7, which is formed along the gate wiring 16.

In the cross sectional structure shown in FIGS. 2A and 2B, each pixel electrode 3 on the pixel electrode substrate 1 having the COT structure and each pixel color layer of one pixel color layer region (R, G and B), which is a color filter provided correspondingly to that pixel electrode are related in structure to each other.

In the present invention, the step portion 12 is formed by making the BM layer 7 thick enough and forming an overcoat 11 thereon as an underlying layer of the pixel electrode.

Particularly, since, in the COT structure, the slope surfaces 13 are formed on the step portions formed by the BM layer, four sides of each pixel electrode are surrounded by the slope surfaces 13. Furthermore, as shown in FIGS. 2A and 2B, alignment layers 5 are formed on an upper surface of the pixel electrode substrate 1 on which the pixel electrodes 3 are formed and a lower surface of the opposing substrate 2 having an upper surface on which the common electrode 4 is formed, respectively.

Figure 3A:
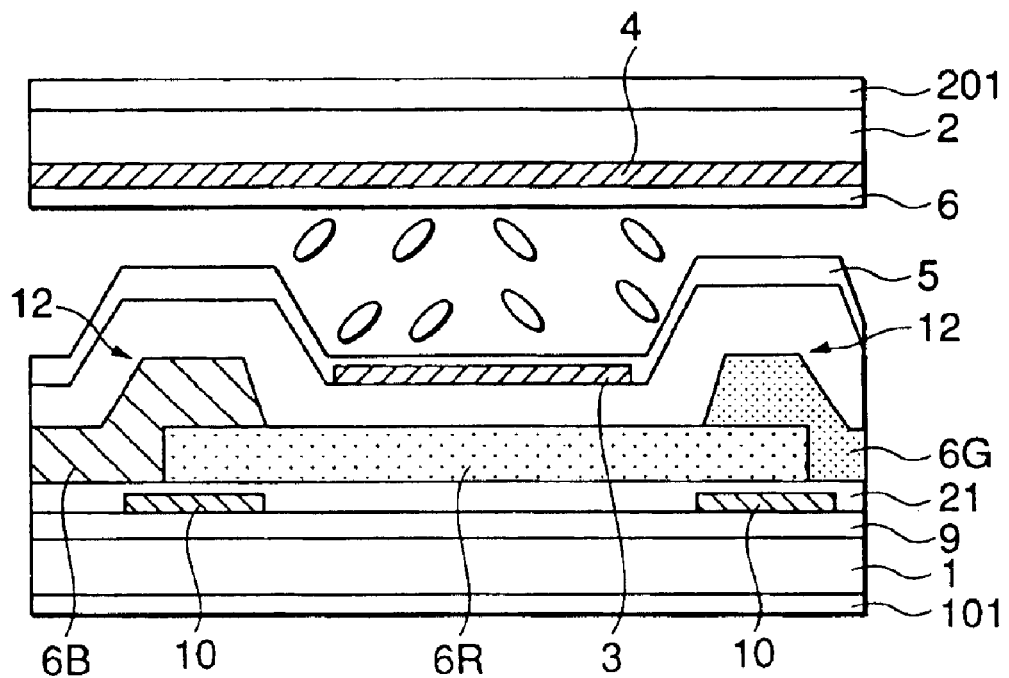
FIG. 3A is a cross section corresponding to the cross section shown in FIG. 2A, conceptually showing another embodiment of the orientation division type liquid crystal display device according to the present invention.
Figure 3B:
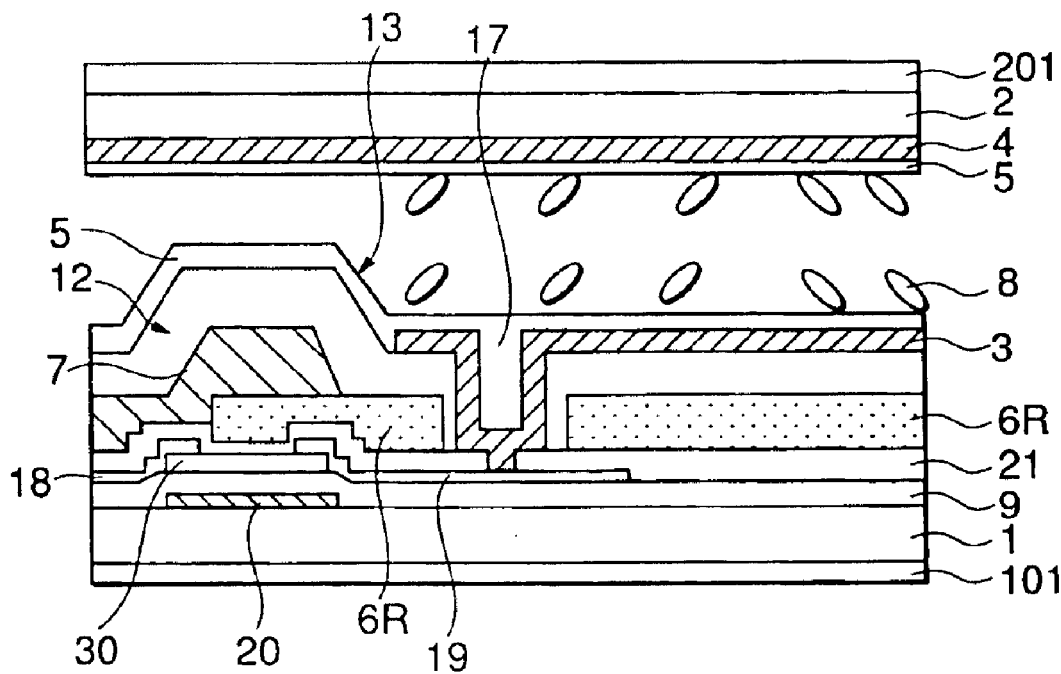
FIG. 3B is a cross section corresponding to the cross section shown in FIG. 2B, conceptually showing another embodiment of the orientation division type liquid crystal display device according to the present invention.

Although the step portions 12 are formed by using the thick BM layer 7 in FIGS. 2A and 2B, such step portions can also be formed by partially overlapping adjacent pixel color layers as shown in FIGS. 3A and 3B. In the example shown in FIG. 3A which is a cross section taken along a line crossing the drain wiring, the adjacent pixel color layers 6R and 6B are partially overlapped on the left side drain wiring to form a step portion 12 and adjacent pixel color layers 6R and 6G are overlapped on the right side drain wiring 10 to form the step portion 12. In the example shown in FIG. 3B which is a cross section taken along a line crossing a gate wiring 16, the step portion 12 is formed by partially overlapping adjacent color layers on the gate wiring 10.

As mentioned above, the liquid crystal display device according to the present invention includes a pixel color layer region (R, G and B) as a color filter for each pixel electrode and is suitably used as an active matrix drive, orientation-division type liquid crystal display device having the COT structure in which the slope surfaces are formed on the side of the pixel electrode substrate.

The present invention is featured in that the slope surfaces provides two cell gaps. There is a preferable range of a ratio of one cell gap to the other cell gap.

Figure 4A:
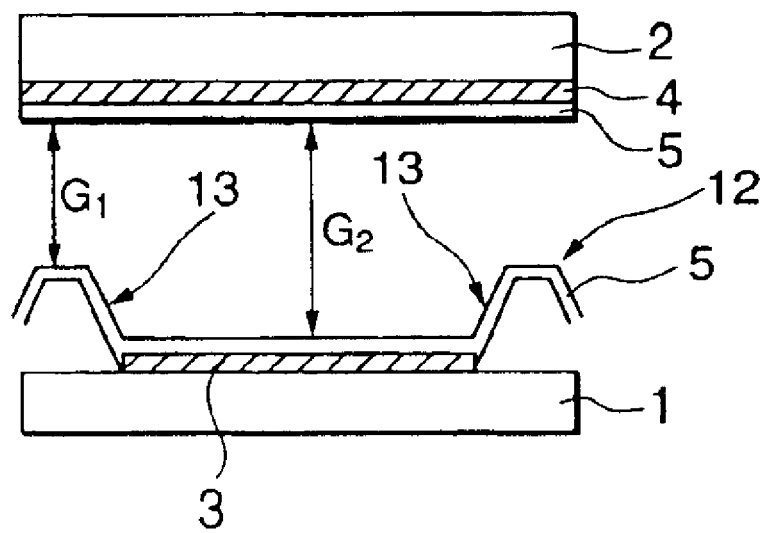
FIG. 4A is a conceptual cross section of the orientation division type liquid crystal display device, for explaining a size of a cell gap in the present invention.

Assuming that a gap between portions of the pixel electrode substrate 1 and the common electrode substrate 2, which oppose each other in an area of the step portion 12, is referred to as a first cell gap $G_1$ and a gap between portions of the substrates 1 and 2, which oppose each other in an area of the pixel electrode 3, is referred to as a second cell gap $G_2$ as shown in FIG. 4A, the gap ratio $G_1/G_2$ is preferably in a range from 2/10 to 9/10.

When the gap ratio $G_1/G_2$ is sufficiently smaller than 2/10, liquid crystal molecules are tilted too much and become substantially parallel to the surface of the pixel electrode, resulting in that orientation of liquid crystal molecules is hardly divided effectively. On the contrary, when the gap ratio $G_1/G_2$ is sufficiently larger than 9/10 and, in order to make an angle of the slope surface to a desired value, a length of the slope surface becomes too long, resulting in that the aperture ratio of the pixel electrode surface tends to be reduced unfavorably. A more preferable range of the gap ratio is from 3/10 to 8/10.

Figure 5A:
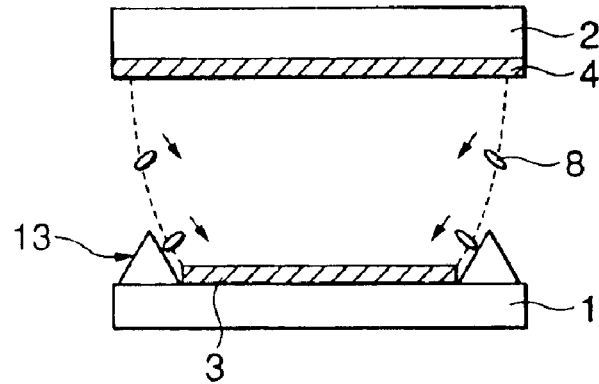
FIGS. 5A to 5D are cross sections of the orientation division type liquid crystal display device according to the present invention, showing a relation between slope surfaces provided on a substrate surface and orientation of liquid crystal molecules.

Thus, when the slope surfaces are provided on the pixel electrode substrate of the liquid crystal display 5 device having the COT structure and a voltage is applied across the cell gap, a resulting electric field is bulged in a slope surface direction of the peripheral portions of the pixel electrode surface as shown in FIG. 5A and liquid crystal molecules in the first gap on the surface of the pixel electrode are oriented along the bulged electric field, so that liquid crystal molecules on the pixel electrode are differently oriented, resulting in a divided orientation. Furthermore, the viewing angle of the pixel display is widened.

Figure 5B:
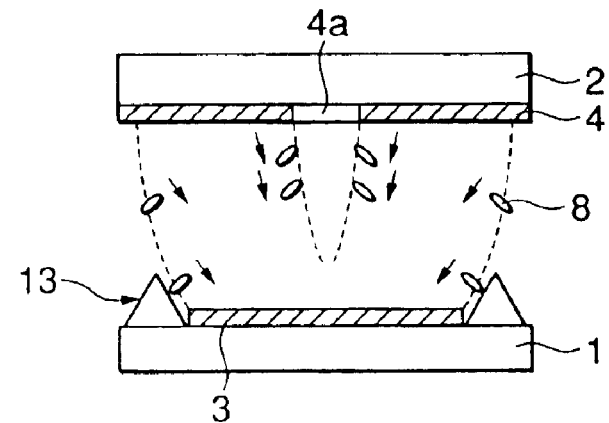

Moreover, in the present invention, the slope surfaces are provided on the pixel electrode substrate and, on demand, an electrode opening 4a is provided in the common electrode 4 on the side of the opposing substrate 2 corresponding to the pixel electrode, as shown in FIG. 5B.

For example, by providing the opening 4a in the common electrode corresponding to a center portion of the pixel electrode, the electric field in that portion is bulged along a wall of the opening, so that liquid crystal molecules are oriented along a bulged plane. Thus, it is possible to further improve the divided orientation, as shown in FIG. 5B.

Figure 5C:
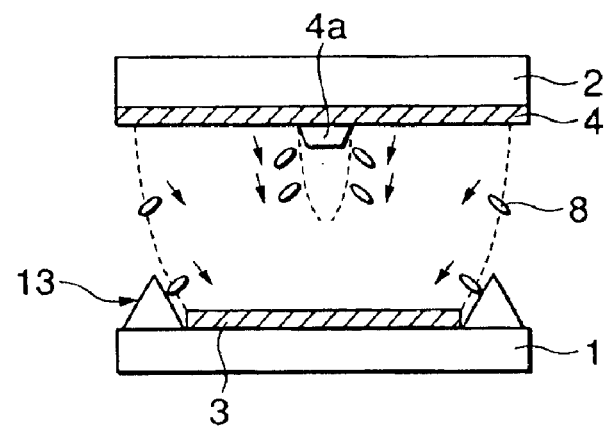
Figure 5D:
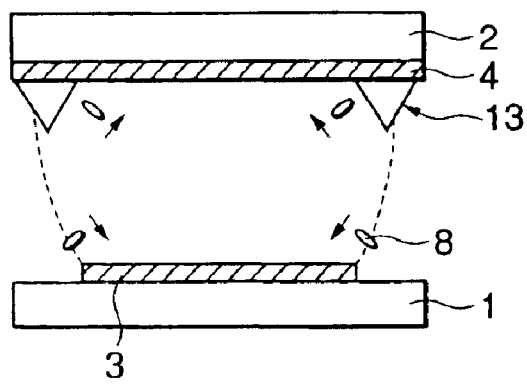

Alternatively, it is possible, in order to obtain a similar effect, to form a downward protrusion 4b having slope surfaces on the lower surface of the common electrode instead of the opening 4a, as shown in FIG. 5C. If the step portions were provided on the side of not the pixel electrode substrate but the opposing substrate 2 as shown in FIG. 5D, the initial orientation of the liquid crystal molecules on the side of the opposing substrate 2 should become opposite to that on the side of the pixel electrode substrate 1 as shown by arrows, so that it is impossible to divide the orientation of liquid crystal molecules to a plurality of domains uniformly.

Figure 6A:
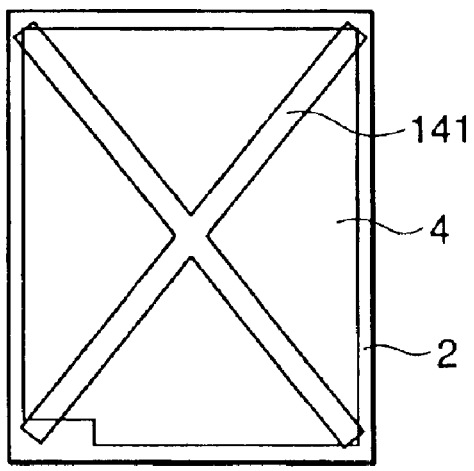
FIGS. 6A to 6D are plan views of typical examples of an electrode opening portion or a protrusion portion provided in a surface of a transparent electrode surface (or a common electrode) on the side of an opposing substrate.
Figure 6B:
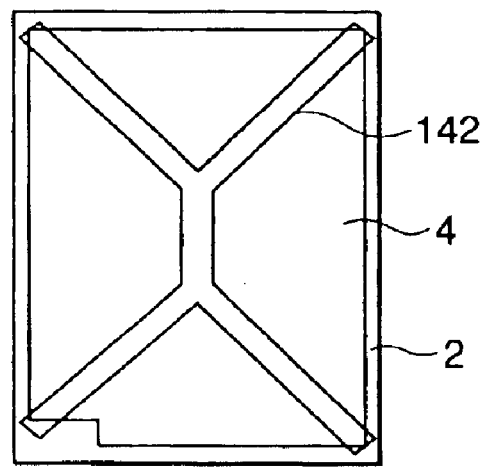
Figure 6C:
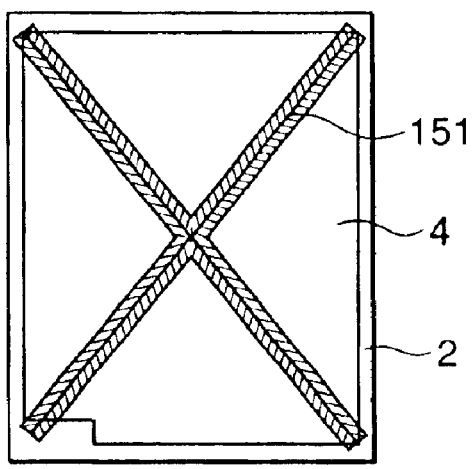

FIGS. 6A and 6B are plan views of an X-shaped opening portion 141 and a modified X-shaped opening portion 142 as examples of the opening portion, which are formed in the common electrodes 4 correspondingly to a shape of the pixel electrodes, respectively.

Figure 6D:
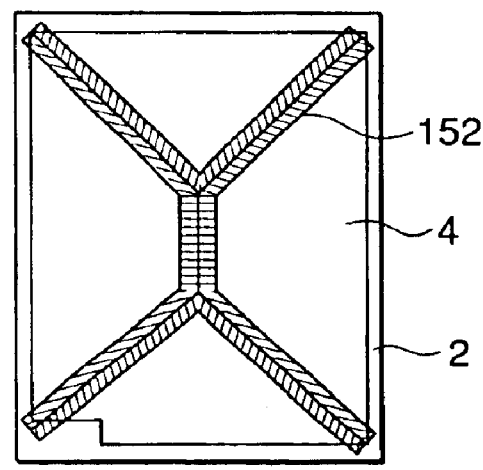

Furthermore, FIGS. 6A and 6D are plan views of an Xshaped protrusion 151 and a modified X-shaped protrusion 152 as examples of the protrusion formed on the common electrode 4.

Figure 7A:
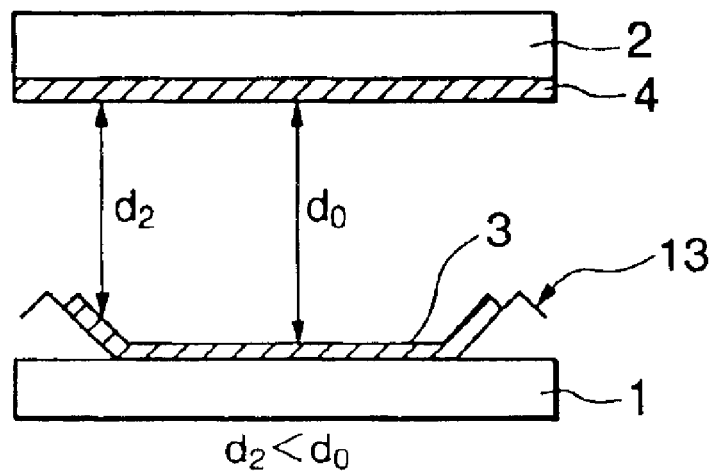
FIGS. 7A and 7B are conceptual cross sections for explaining a relation between a transparent pixel electrode film (ITO) and a slope surface adjacent thereto.

In forming the pixel electrode, it is preferable that peripheral portion of the transparent pixel electrode film 3 is not overlapped on the slope surfaces 13 as shown in FIG. 7A. More preferably, a gap $d_1$ at the edge portions of the pixel electrode 3 becomes substantially the same as the gap $d_0$ at the center portion thereof as shown in FIG. 7B.

Figure 7B:
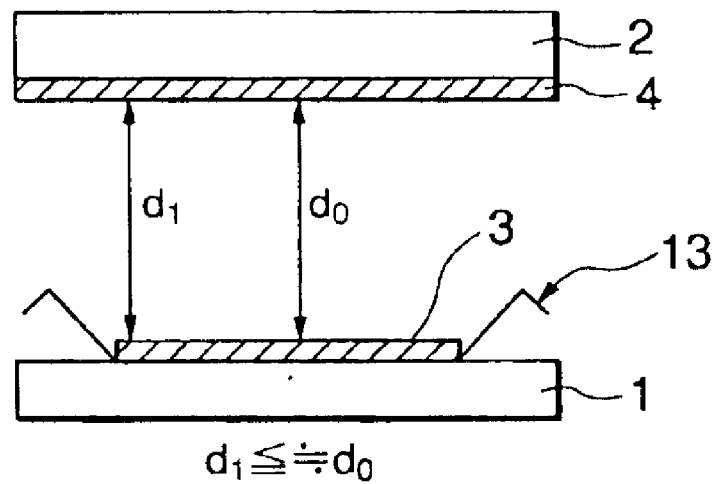

That is, in FIGS. 7A and 7B, a relation between transmitting light intensity I of the liquid crystal layer and the gap d of the liquid crystal layer, that is, thickness of the liquid crystal layer, satisfies the following equation:

$$I = I_0 \sin^2 2\theta \sin^2(\pi d n/\lambda)$$

where $I_0$ is an intensity of incident light, $\theta$ is an angle between a direction of incident polarized light and a vibration direction of usual light in a cell, n is a birefringence rate at applied voltage V and $\lambda$ is light wavelength.

As is clear from the above equation, transmitted light intensity I is proportional to the gap d. Therefore, if the peripheral portion of the transparent electrode 3 is overlapped on the slope surface as shown in FIG. 7A, the gap $d_2$ on the edge portion of the electrode 3 becomes smaller than the gap $d_0$ in the center portion thereof ($d_2 < d_0$), so that light transmittivity of the peripheral portion of the pixel electrode is reduced, causing brightness of the pixel display to be uneven.

In the present invention, the slope surfaces are provided such that liquid crystal molecules on the pixel electrode are oriented vertically with respect to the slope surfaces. Therefore, it is preferable that the alignment layers 5 shown in FIGS. 2A and 2B are vertical alignment layers so that liquid crystal molecules 8 are oriented vertically with respect to the surface of the pixel electrode substrate.

In addition to the use of the vertical alignment layers, liquid crystal filling the gap between the substrates is preferably liquid crystal having a negative dielectric anisotropy.

From the above, a method for fabricating the orientation division type liquid crystal display device having the step portions on the pixel electrode substrate having the COT structure and the slope surfaces formed on the step portions according to an embodiment of the present invention will be described with reference to FIGS. 2A and 2B.

In FIG. 2B, after a conductive film of Cr, etc., is formed on the transparent substrate 1 formed of, for example, a glass material, the gate electrode 20 and the gate wiring shown in FIG. 2B are formed by patterning the conductive film with using a predetermined mask related to the pixel electrode array. Thereafter, the gate insulating film 9 of such as silicon nitride is formed on the wafer to cover the gate electrode and, then, the semiconductor layer 30 of amorphous silicon is formed on the gate insulating film 9. The semiconductor layer 30 is then subjected to photolithography process to provide a predetermined patterning.

Thereafter, the drain electrode 18, the drain wiring 10 (FIG. 2A), the source electrode 19 and the source wiring are formed of a conductive material such as molybdenum through similar patterning processes. Then the passivation film 21 of an insulating material such as silicon nitride is formed on the wafer.

Thereafter, the color layers 6, which become the color filter, are formed. The color layers 6 are usually resin films containing red (R), green (G) and blue (B) dyes or pigments, respectively. The color layers 6 are formed by forming the red layer 6R, the green layer 6G and the blue layer 6B. Each of the red, green and blue layers is formed through the steps of, for example, painting the wafer with a resist film in the form of a negative type light sensitive resin film containing acrylic resin as a base material and one of the red, green and blue pigments dispersed therein, with using the spin coating, pre-baking the resist film, patterning the resist by exposition and development with using a photo mask and, finally, post-baking it.

Then, as shown in FIGS. 2A and 2B, the BM layer 7 is formed as the light shield film. The BM layer 7 is formed through similar steps to those used to form the color layer 6 except that black pigment is dispersed in the acrylic resin.

Thereafter, the overcoat layer 22 of thermosetting resin such as acrylic resin, which is a transparent insulating layer, is formed on the BM layer 7 and, then, a contact hole 17 is formed in a predetermined position on the source electrode 19, as shown in FIG. 2B.

Then, the pixel electrode 3 in the form of a transparent conductive film such as an ITO film is formed through the patterning step including the steps of sputtering, photolithography and etching. In this stage, the pixel electrode 3 is connected to the source electrode 19 through the contact hole 17, as shown in FIG. 2B. Furthermore, as shown in FIGS. 2A and 2B, the alignment layer 5 is formed on the uppermost layer of the wafer as a polyimide film, a polyvinyl film or a slant vapor-deposited SiO film.

In the present invention, the step portion 12 can be easily formed by setting the thickness of the BM layer such that an upper surface of the EM layer becomes higher than the surface of the color layer 6, as shown in FIGS. 2A and 2B.

In the present invention, the overcoat layer 22 and the alignment layer 5 are formed on the step portion 12 thus formed by the BM layer 7 such that the cross section of the lamination of the alignment layer 5, the overcoat layer 22 and the step portion 12 becomes trapezoidal as shown in FIGS. 2A and 2B. Root portions of the slope surfaces of the step portions on the opposite sides of the pixel electrode are in the vicinity of the opposite peripheral portions of the pixel electrode. As a result, the slope surfaces rise from the opposite side edge portions of the pixel electrode.

Figure 4B:
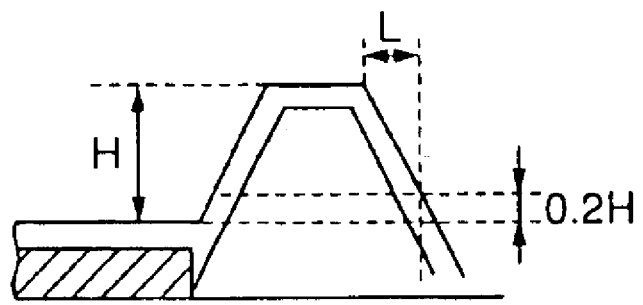
FIG. 4B is a conceptual cross section of the orientation division type liquid crystal display device, for explaining a size relation of a step portion in the present invention.

Assuming that height H of the slope portion is defined by a distance between an uppermost surface of the alignment layer on the step portion having the trapezoidal cross section and the surface of the alignment layer on the pixel electrode and length L of the slope portion is defined by a distance in the width direction of the step portion between the above mentioned side edge portion and an edge of the uppermost surface of the alignment layer on the step portion, as shown in FIG. 4B, the length L is preferably equal to a length in a horizontal plane of the substrate between a position on the slope surface of the step portion, which is about 20% of the height H, and the edge of the uppermost surface of the alignment layer.

When the position on the slope surface of the step portion is lower than 20% of the height H, the material of the alignment layer in liquid state tends to be pooled in the root portion of the slope portion during the formation of the alignment layer, so that it is difficult to control the length of the slope surface.

As mentioned previously, it is possible in the present invention to set the height of the slope portion through this step portion suitably by regulating the thickness of the BM layer.

Furthermore, the length L of the slope surface in the width direction of the step portion can be suitably regulated by regulating an exposing time when the BM layer is patterned.

Moreover, the height H and the length L of the step portion can be suitably regulated by regulating the thickness of the overcoat layer.

For example, when the height H of the slope portion is 1.1 μm and the length L of the slope surface is 2.0 μm, the thickness of the BM layer is 1.3 μm and the thickness of the overcoat layer is 0.4 μm.

The present invention is featured in that the clearly defined step portion is formed in the side edge portions of the pixel electrode corresponding to the pixel color layer by forming the BM layer as thick as 1.3 μm between the adjacent pixel color layers.

As mentioned previously, the BM layer is formed by forming the pigment dispersed resist by using a coating process such as spin coating.

When the BM layer as thick as 1.3 μm is formed by etching a silicon nitride or silicon oxide film, it is necessary to form a plurality of silicon nitride or silicon oxide films since thickness of such film, which can be formed in one time, is usually in a range from several nm to several tens nm. Therefore, the spin coating used in the present invention can substantially reduce the process load compared with the etching method.

Through the above mentioned fabrication method according to the present invention, the first cell gap $G_1$ and the second cell gap $G_2$ are provided with the gap ratio $(G_1/G_2)$= 2/10~9/10, as mentioned previously.

Furthermore, for the above mentioned reason, the transparent electrode film of the pixel electrode can be suitably formed such that the transparent electrode film is not overlapped with the slope surfaces.

In order to orient liquid crystal molecules vertically with respect to the slope surfaces, the alignment layers formed on the pixel electrodes and the slope surfaces of the pixel electrode substrate and on the common electrode substrate are preferably formed as the Vertical alignment layers.

As shown in FIGS. 6A to 6B, the suitably patterned electrode opening portion is formed in the common electrode of the common electrode substrate, that is, the opposing substrate, or the suitably patterned protrusion is formed on the lower surface of the common electrode, on demand, and the opening or the protrusion can be formed by using any known method. Other structural elements are formed on the side of the pixel electrode substrate concentrically.

Advantages of the present invention are described with reference to the preferred embodiments. It should be noted, however, that the present invention is not limited thereto.
(Embodiment 1)

Figure 8A:
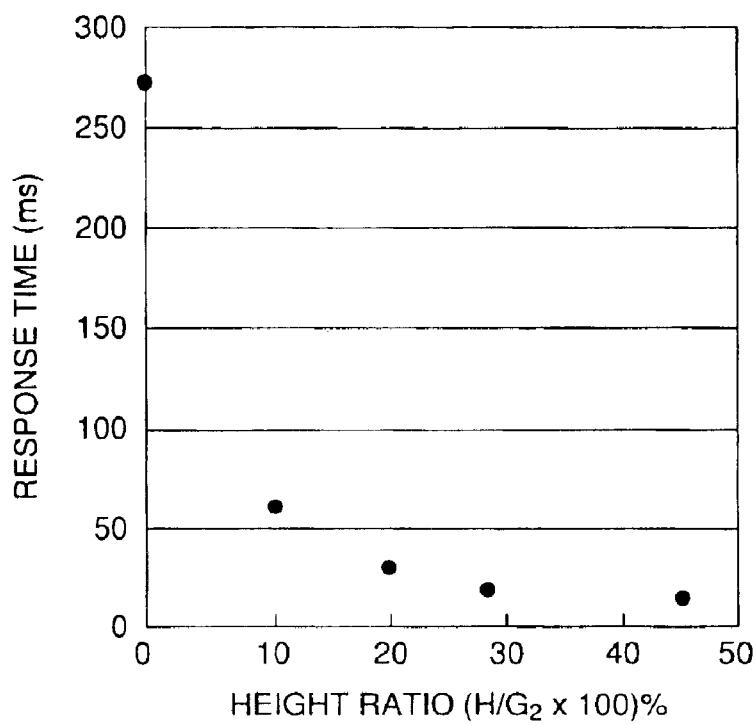
FIGS. 8A and 8B show a relation between response time of division of orientation and height and tilting angle of the slope portion of the present invention, respectively.

Four liquid crystal cells having the COT structures including step portions having slope length L of 2.0 μm commonly and heights H of 0.4 μm, 0.8 μm, 1.1 μm and 1.8 μm, respectively, were prepared and response times of the respective liquid crystal cells were measured while applying voltages in a range from 0 V to 5 V across the liquid crystal cells. Table 1 and FIG. 8A show the result of the measurement. Incidentally, the thickness of the liquid crystal layers, that is, the second cell gaps $G_2$, were 4.0 μm, commonly.

TABLE 1

| slope height (μm) | no slope | 0.4 | 0.8 | 1.2 | 1.8 |
|---|---|---|---|---|---|
| height ratio (%) | — | 10 | 20 | 28 | 45 |
| response time (ins) | 272.9 | 62.1 | 31.9 | 20.6 | 15.7 |

The height ratio in Table 1 is a ratio (%) of the height of the slope to the thickness of the liquid crystal layer.

As is clear from Table 1, the response time is substantially improved by the provision of the slope formed on the step portion. When the slope height is 0.8 μm, the response time becomes about a half of that obtained when the slope height is 0.4 μm and is further improved with increase of the slope height.

From this result of the measurement, it is preferable that the height ratio of the slope with respect to the thickness of the liquid crystal layer is 20% or more, more preferably, 28% or more.

The height of the slope portion of 0.4 μm corresponds to the usual thickness of the gate insulating film of silicon nitride or silicon oxide when the gate insulating film is formed.

According to the present invention, the response time is further reduced by increasing the thickness of the gate insulating film to, for example, 0.8 μm.

In addition, since it is easy to regulate the height of the slope by means of an organic resist used for the formation of the BM layer, the forming process thereof is substantially simplified compared with a case where the slope portion is formed by piling a plurality of silicon nitride films. Therefore, the formation of the slope portion according to the present invention is very preferable in view of advantages of the simplified process with shortened time and the uniformity of the formed slope portion, etc.
(Embodiment 2)

Figure 8B:
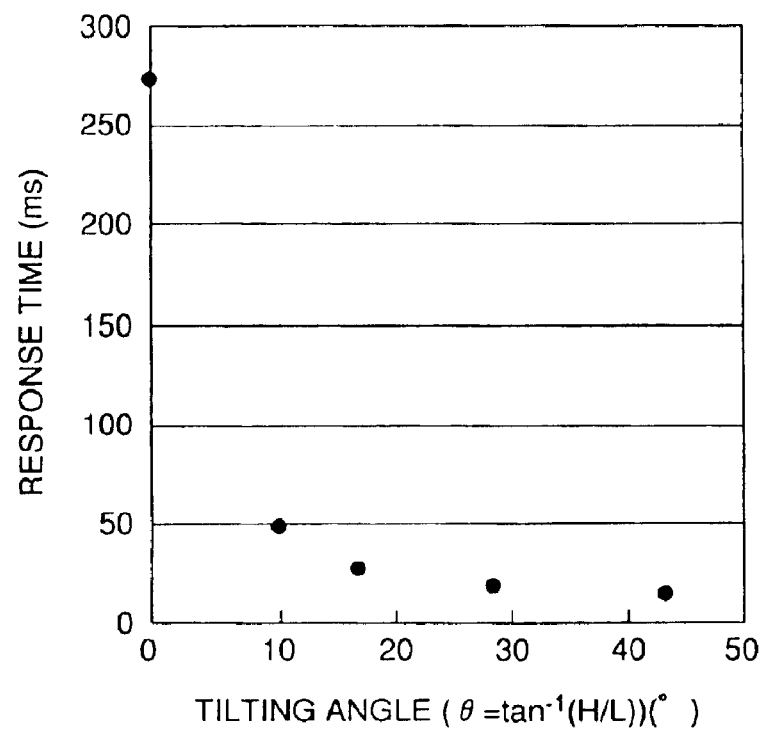

Four liquid crystal cells having the COT structures, 15 which are similar to those in the embodiment 1 and include step portions having slope heights H of 1.1 μm commonly and slope lengths L of 1.2 μm, 2.0 μm, 3.5 μm and 5.8 μm, respectively, were prepared and response times of the respective liquid crystal cells were measured while applying voltages in a similar range to that used in the embodiment 1 across the liquid crystal cells. Table 2 and FIG. 8B show the result of the measurement. Incidentally, the thickness' of the liquid crystal layers, that is, the second cell gaps $G_2$, were 4.0 μm, commonly, and the tilting angle θ of the slope is represented by the following equation:

$$\theta = \tan^{-1}(H/L)$$

TABLE 2

| slope length (μm) | no slope | 1.2 | 2.0 | 3.5 | 5.8 |
|---|---|---|---|---|---|
| tilting angle (θ) | — | 43 | 29 | 17 | 11 |
| response time (ms) | 272.9 | 18.1 | 20.6 | 31.0 | 48.2 |

As is clear from Table 2, the response time to the orientation division of the liquid crystal layer is substantially improved by the provision of the slope formed on the step portion.

That is, it is clear that the response time is improved by setting the slope length L to a value smaller than 5.8 μm to increase the tilting angle of the slope. Particularly, when the slope length L is smaller than 2.0 μm, the response time is further reduced. Therefore, it is clear that the response time of the liquid crystal orientation division is further improved by using the tilting angle of the slope larger than 11° preferably, larger than 29°.

Table 3 shows a relation between $G_1/G_2$ ratio and $H/G_2$ ratio, with which the aperture ratio of a pixel electrode, which has an area 300 μm×100 μm, the first cell gap $G_1=4$ μm and the tilting angle of the slope of 11°, 50% or more.

TABLE 3

| $G_1/G_2$ ratio | 7.2/10 | 6.5/10 | 2.0/10 | 0/10 |
|---|---|---|---|---|
| $H/G_2$ ratio | 2.8/10 | 3.5/10 | 8.0/10 | 10/10 |
| aperture ratio (≧50%) | ○ | ○ | ○ | X |

According to the present invention, it is possible to uniformly divide orientation of liquid crystal filling the gap between the pixel electrodes on the pixel electrode substrate having the COT structure and the common electrode of the opposing substrates to a plurality of orientations by providing the slopes surrounding the respective pixel electrodes.

Furthermore, it is possible to substantially reduce the initial orientation response time required to uniformly align liquid crystal molecules and divide the direction of alignment to a plurality of directions when a voltage is applied to the liquid crystal cells in order to drive the liquid crystal cells.

Therefore, according to the present invention, it is possible to provide an orientation division type liquid crystal display device, which has the COT structure and the slopes surrounding the respective pixel electrodes and is capable of aligning and dividing the orientation of liquid crystal molecules to a plurality of orientations in the initial orientation within a shortened response time to thereby increase the viewing angle of the pixel display by the pixel electrodes, an image display method and a fabrication method of the display device.

What is claimed is:

1. An orientation division type liquid crystal display device comprising:

a pixel electrode substrate including pixel electrodes, thin film transistors, color filters and a first alignment layer covering said pixel electrodes, said thin film transistors and said color filters;

an opposing substrate including a common electrode and a second alignment layer covering said common electrode and opposing to said alignment layer of said pixel electrode substrate;

a liquid crystal layer disposed between said first and second alignment layers;

wiring patterns related to said thin film transistors of said pixel electrode substrate and arranged around said pixel electrodes;

protrusions protruding from a surface of said pixel electrodes toward said common electrode and extending along said wiring patterns to form slopes, said liquid crystal layer being controlled such that, in an initial orientation of said liquid crystal layer, orientation of liquid crystal molecules of said liquid crystal layer is divided into a plurality of orientations by said slopes; and an underlying layer of said pixel electrodes extends such that an apex portion of said protrusions protrude from said surfaces of said pixel electrodes toward the side of said common electrode and, below said underlying layer, edge portions of adjacent color filters are overlapped such that said overlapped edge portions of said adjacent color filters have a thickness equal to a thickness with which said overlapped edge portions of said adjacent color filters protrude from a surface of said adjacent color filters, and said liquid crystal layer having a thickness between said pixel electrode and said common electrodes being substantially the same such that the thickness of a first gap at edge portions of said pixel electrode becomes substantially the same as the thickness of a second gap at the center portion thereof;

wherein said apex portion is not in contact with said opposing substrate.

* * * * *